United States Patent [19]
Saida et al.

[11] Patent Number: 6,019,162
[45] Date of Patent: Feb. 1, 2000

[54] AIR CONDITIONING APPARATUS FOR VEHICLE

[75] Inventors: Kazunori Saida, Nukata-gun; Hiromi Tahara, Toyota, both of Japan

[73] Assignee: Denso Corporation, Kariya, Japan

[21] Appl. No.: 09/139,297

[22] Filed: Aug. 25, 1998

[30] Foreign Application Priority Data

Sep. 12, 1997 [JP] Japan .................................. 9-248927
Jul. 10, 1998 [JP] Japan ................................ 10-196017

[51] Int. Cl.$^7$ ...................................................... F25B 29/00
[52] U.S. Cl. .............................. 165/42; 165/43; 165/76; 165/75; 62/244; 62/298; 454/156
[58] Field of Search .................................. 165/42, 43, 75, 165/76; 62/244, 298; 454/161, 156, 160; 237/12.3 A, 12.3 B

[56] References Cited

U.S. PATENT DOCUMENTS

| | | | |
|---|---|---|---|
| 2,690,654 | 10/1954 | Graham | 62/298 |
| 4,523,633 | 6/1985 | Furukawa et al. | 165/76 |
| 4,892,135 | 1/1990 | Sakurada et al. | 165/43 |
| 5,404,729 | 4/1995 | Matsuoka et al. | 62/179 |
| 5,615,491 | 4/1997 | Bae | 165/43 |

FOREIGN PATENT DOCUMENTS

| | | |
|---|---|---|
| 0 818 334 A1 | 1/1998 | European Pat. Off. . |
| 0167320 | 9/1984 | Japan .................................. 454/156 |
| 0113715 | 6/1985 | Japan ...................................... 165/43 |
| WO 97/00178 | 1/1997 | WIPO . |

*Primary Examiner*—John K. Ford
*Attorney, Agent, or Firm*—Harness, Dickey & Pierce, PLC

[57] ABSTRACT

An air conditioning apparatus for a vehicle includes a blower case for accommodating a blower, an air conditioning case for accommodating an evaporator and a heater core, and a middle duct detachably connected to both the blower case and the air conditioning case. The air conditioning case is disposed at a side of the blower case to form a space having a predetermined distance therebetween, the evaporator is disposed in the air conditioning case approximately horizontally, and the heater core is disposed approximately horizontally at an upper side of the evaporator. Further, a receiving portion for supporting the evaporator is formed on an inner surface of the middle duct. In the air conditioning apparatus, the evaporator can be taken out from the air conditioning case to the space between the air conditioning case and the blower case by the detachment of the middle duct from the blower case and the air conditioning case, while the blower case and the air conditioning case are installed in the vehicle.

13 Claims, 5 Drawing Sheets

AIR CONDITIONING APPARATUS FOR VEHICLE

CROSS-REFERENCE TO RELATED APPLICATION

This application is related to and claims priority from Japanese Patent Applications No. Hei. 9-248927 filed on Sep. 12, 1997, and No. Hei. 10-196017 filed on Jul. 10, 1998, the contents of which are hereby incorporated by reference.

BACKGROUND OF THE INVENTION

1. Field of the Invention

The present invention relates to a horizontal-type air-conditioning apparatus for a vehicle, in which an evaporator is disposed approximately horizontally, a heater core is disposed at an upper side of the evaporator approximately horizontally, and a blower is disposed at a side of the evaporator so that air blown from the blower is introduced into the evaporator from below.

2. Description of Related Art

Conventionally, a horizontal-type air-conditioning apparatus for a vehicle is described in U.S. Pat. No. 5,755,107. As shown in FIG. 6, the conventional air-conditioning apparatus 201 includes a blower unit 204 having an inside/outside air switching box 202 and a blower 203, a cooler unit having an evaporator (i.e., cooling heat exchanger) 205, and a heater unit having a heater core (i.e., heating heat exchanger) 206 and a mode switching portion 207. In the conventional air-conditioning apparatus, the evaporator 205 is approximately horizontally disposed at a side of the blower 203, and the heater core 206 is disposed approximately horizontally at an upper side of the evaporator 205. The evaporator 205 and the heater core 206 are accommodated in an air conditioning case 211, and the mode switching portion 207 is provided in the air conditioning case 211 at an upper side of the heater core 206.

Further, the blower 203 is accommodated in a blower case 201 connected to the air conditioning case 206. The air conditioning apparatus 201 is installed in a passenger compartment around an instrument panel in such a manner that a left-right direction in FIG. 6 corresponds to a left-right direction of the vehicle. Thus, air blown by the blower 203 passes through the evaporator 205 and the heater core 206, and is introduced into the passenger compartment from the mode switching portion 207.

However, in the conventional air conditioning apparatus 201, the heater unit 206 and the mode switching portion 207 are disposed above the evaporator 205. Therefore, when it is necessary to detach the evaporator 205 from the air conditioning case 211, the air conditioning case 211 is divided, after the blower case 210 and the air conditioning case 211 are respectively detached from the vehicle. That is, after the detachment of the blower case 210 and the air conditioning case 211 from the vehicle, the evaporator 205 can be taken out from the air conditioning case 211. Thus, a long time is necessary to change or clean the evaporator 205 in the conventional air-conditioning apparatus 201.

SUMMARY OF THE INVENTION

In view of the foregoing problems, it is an object of the present invention to provide a horizontal-type air-conditioning apparatus for a vehicle, in which a heat exchanger such as an evaporator can be readily changed and repaired without detachments of a blower case and an air conditioning case from the vehicle.

According to the present invention, in an air conditioning apparatus for a vehicle, a first case for accommodating a blower is disposed at a side of a second case to form a space having a predetermined distance therebetween, a cooling heat exchanger is disposed in the second case approximately horizontally at a side of the blower, a heating heat exchanger for heating air from the cooling heat exchanger is disposed in the second case approximately horizontally at an upper side of the cooling heat exchanger, a middle duct is disposed between the first case and the second case to be detachably connected to the first case and the second case in such a manner that air blown by the blower is introduced into the cooling heat exchanger through the middle duct, and the second case has a first opening portion through which the cooling heat exchanger is detached from the second case to the space between the first case and the second case by a detachment of the middle duct from the first and second cases. Thus, for example, when the cooling heat exchanger is changed or repaired, only the middle duct is detached from the first and second cases while the first and second cases are attached into the vehicle. That is, it is not necessary to detach the second case having therein the cooling heat exchanger from the vehicle when the cooling heat exchanger is changed or repaired. Because the cooling heat exchanger can be taken out from the second case by only removing the middle duct from the first case and the second case, a change operation of the cooling heat exchanger can be made simple, and time for changing the cooling heat exchanger can be reduced, for example.

Further, a first receiving portion for supporting a bottom surface of the cooling heat exchanger is formed on an inner surface of the middle duct. Therefore, the cooling heat exchanger can be held and fixed in the second case by using the first receiving portion, a special fixation member for fixing the cooling heat exchanger in the second case is not necessary, and the structure of the air conditioning apparatus can be made simple.

Preferably, the second case has a side wall surface opposite to the first case, the first opening portion is formed in the side wall surface at a lower side thereof, the middle duct has a cover portion which is connected to the second case to close the first opening portion when the cooling heat exchanger is installed in the second case, and the first receiving portion is formed in the cover portion. Therefore, the cooling heat exchanger can be readily detached from the second case into the space between the first case and the second case while the first and second cases are maintained at an attachment state in the vehicle. Thus, time for a change or a maintenance of the cooling heat exchanger can be further reduced.

More preferably, the second case has a second opening portion for detaching the heating heat exchanger from the second case to the space between the first case and the second case. Therefore, the heating heat exchanger can be also readily detached from the second case into the space between the first case and the second case.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be now described hereinafter with reference to FIGS. 1–5.

Figure 1:
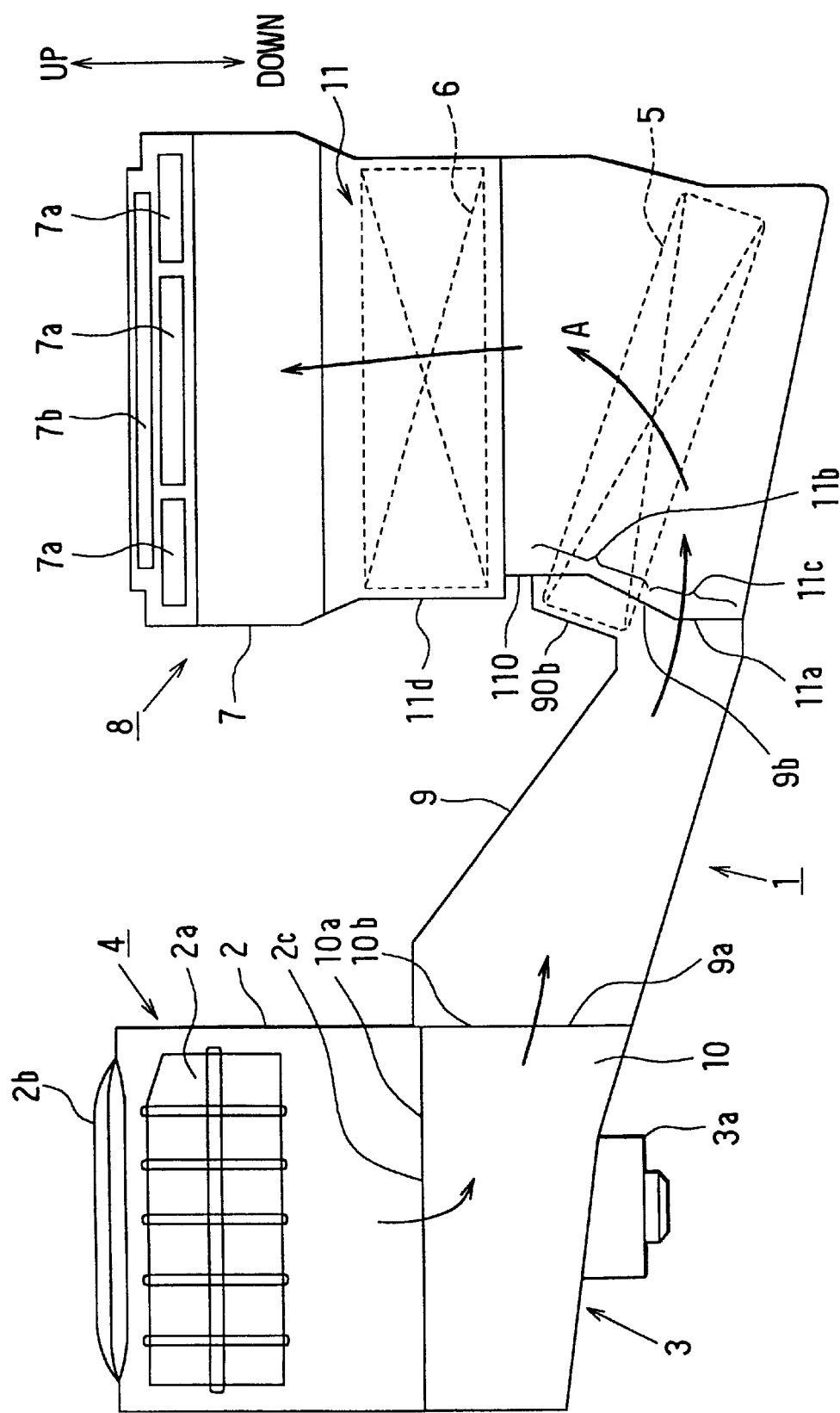
FIG. 1 is a schematic view showing an entire construction of an air conditioning apparatus according to a preferred embodiment of the present invention.
Figure 2:
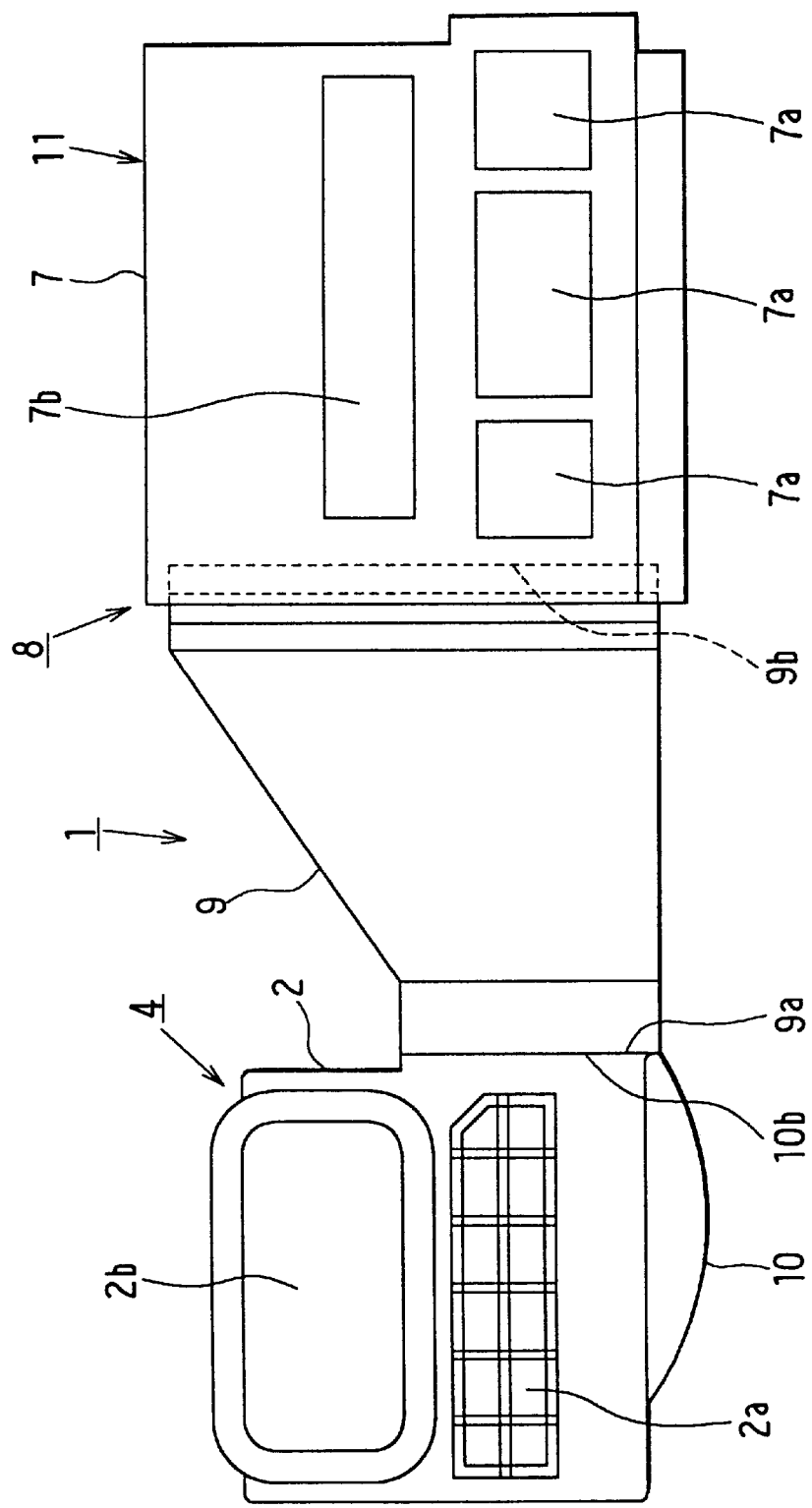
FIG. 2 is a top view of the air conditioning apparatus in FIG. 1.

As shown in FIGS. 1 and 2, a horizontal-type air conditioning apparatus 1 for a vehicle includes an air conditioning unit 8, a blower unit 4 disposed at a side of an air conditioning unit 8, and a middle duct 9 for connecting the air conditioning unit 8 and the blower unit 4. The air conditioning unit 8 includes an evaporator (i.e., cooling heat exchanger) 5, a heater core (i.e., heating heat exchanger) 6 and a mode switching portion 7. On the other hand, the blower unit 4 includes an inside/outside air switching box 2 and a blower 3.

The air conditioning apparatus 1 is disposed in a passenger compartment around an instrument panel. For example, in a vehicle having a right steering wheel, the air conditioning unit 8 is disposed approximately at a center portion of the vehicle in a left-right direction (i.e., width direction) of the vehicle, and the blower unit 4 is disposed at a left side of the air conditioning unit 8 to be shifted from the center portion in the left-right direction of the vehicle.

The inside/outside air switching box 2 has an inside air introduction port 2a for introducing therein inside air (i.e., air inside the passenger compartment), an outside air introduction port 2b for introducing therein outside air (i.e., air outside the passenger compartment), and an opening portion 2c through which air introduced from the air introduction ports 2a, 2b is supplied to the blower 3. The air introduction ports 2a, 2b are opened and closed by an inside/outside air switching door (not shown).

The blower 3 is disposed under the inside/outside air switching box 2. The blower 3 includes a centrifugal multi-blade fan (sirocco fan), a driving motor 3a for driving the fan, and a blower case (i.e., first case) 10 for accommodating the fan and the driving motor 3a.

An upper opening portion 10a and a side opening portion 10b are respectively formed in the blower case 10. The upper opening portion 10a of the blower case 10 is air-tightly connected to the opening portion 2c of the inside/outside switching box 2, and the side opening portion 10b of the blower case 10 is air-tightly connected to the middle duct 9 through a packing by using a L-shape insertion method. When the blower 3 is driven, air from the inside/outside air switching box 2 passes through the blower 3, and is introduced into the middle duct 9 from the side opening portion 10b by the blower 3.

Figure 3:
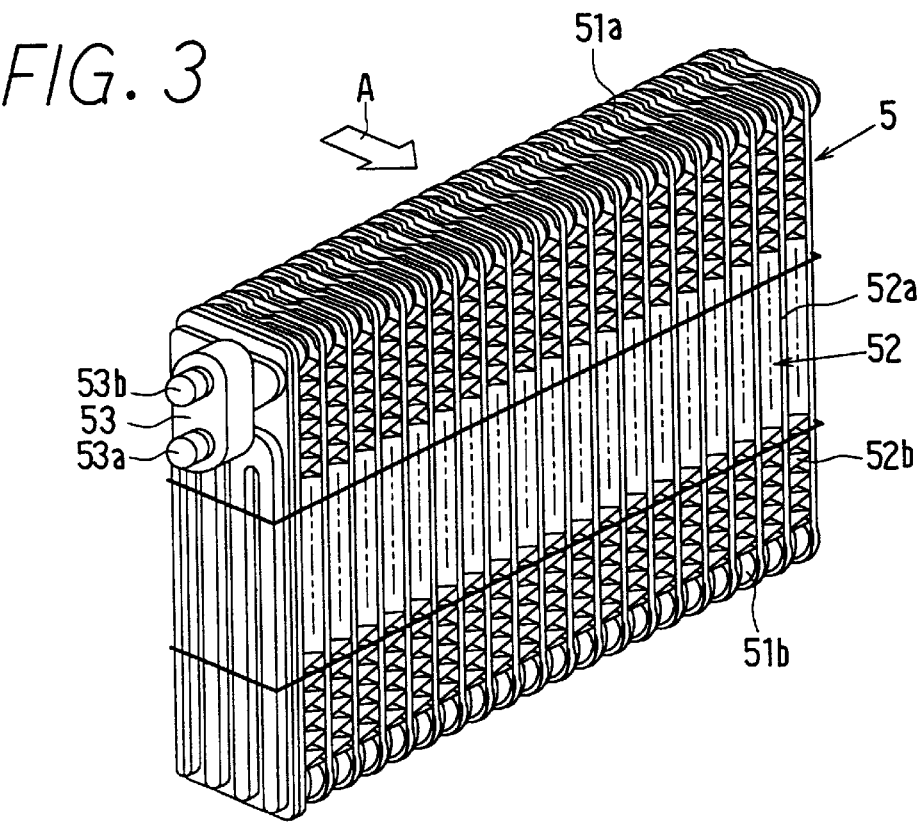
FIG. 3 is a perspective view showing an evaporator of the air conditioning apparatus.

As shown in FIG. 3, the evaporator 5 of a refrigerant cycle is formed in thin in a flow direction A of air, and has a rectangular shape. The evaporator 5 includes two tank portions 51a, 51b, and a heat-exchanging portion 52 disposed between the both tank portions 51a, 51b. The heat-exchanging portion 52 has a plurality of laminated tubes 52a, and corrugated fins 52b each of which is disposed between adjacent tubes 52a. Further, a pipe joint 53 is formed at a side end surface (e.g., left end surface in FIG. 3) of the evaporator 5. The pipe joint 53 includes an inlet pipe 53a through which refrigerant flows into the evaporator 5, and an outlet pipe 53b through which refrigerant having heat-exchanged in the evaporator 5 is discharged to the outside of the evaporator 5.

Gas-liquid two-phase refrigerant having a low temperature and a low pressure, from an expansion valve of the refrigerant cycle, flows into a refrigerant passage formed by the tank portions 51a, 51b and the tubes 52a from the inlet tank 53a, and then flows into a compressor of the refrigerant cycle from the outlet pipe 53b. Thus, air flowing in a direction indicated by A in FIGS. 1, 3 is cooled by an evaporation latent heat of refrigerant of the refrigerant cycle, while passing through the heat-exchanging portion 52 of the evaporator 5.

As shown in FIG. 1, the evaporator 5 is disposed at a side of the blower 3 approximately horizontally. That is, the evaporator 5 is slightly inclined relative to a horizontal direction by an inclination angle $\theta$ (e.g., $\theta=18°$). In the embodiment, air blown from a side of the evaporator 5 by the blower 3 upwardly passes through the evaporator 5 from below. Because the evaporator 5 is disposed to be slightly inclined, condensed water generated on the evaporator 5 can be readily gathered and discharged.

The heater core 6 includes a tank portion and a plurality of tubes. The heater core 6 heats air passing therethrough using engine-cooling water (hot water) flowing therein. The heater core 6 is disposed at an upper side of the evaporator 5 approximately horizontally. Air having passed through the evaporator 5 flows into the heater core 6 from below and flows upwardly toward the mode switching portion 7. A hot-water control valve for controlling a flow rate of hot water flowing into the heater core 6 is formed in the heater core 6, and a heating-air amount by the heater core 6 is adjusted by the hot-water control valve to control the temperature of air blown toward the passenger compartment. However, an air-mixing door may be formed at a position proximate to the heater core 6, and the amount of air passing through the heater core 6 may be adjusted by the air-mixing door to control the temperature of air blown toward the passenger compartment.

In the air conditioning unit 8, the evaporator 5 and the heater core 6 are accommodated within an air conditioning case 11 (second case). The heater core 6 is held in and fixed to a shelf portion protruding from an inner surface of the air conditioning case 11. A fixation method of the evaporator 5 in the air conditioning case 11 will be described later.

The air conditioning case 11 has a plurality of division cases made of resin, and the division cases are air-tightly connected by using a fastening member (e.g., a screw and a clip) and a packing. The air conditioning case 11 has a side wall surface 110 that faces to the blower unit 4, and an opening portion 11a is formed at a lower side of the side wall surface 110. As shown in FIG. 1, an opening portion 11b for taking out the evaporator 5 from the air conditioning case 11 is formed in the side wall surface 110 at an upper side of the opening portion 11a. That is, through the opening portion 11b, the evaporator 5 is detached from the air conditioning case 11. In the embodiment, because a part of the tank portion 51a of the evaporator 5 protrudes from the opening portion 11b, the evaporator 5 can be readily taken out from the air conditioning case 11.

The opening portion 11a is composed of the opening portion 11b for taking out the evaporator 5 and a ventilation opening portion 11c through which air from the middle duct 9 is introduced into a lower surface of the evaporator 5. The opening portion 11b is closed when the middle duct 9 is connected to the air conditioning case 11.

In the side wall surface 110 of the air conditioning case 11, an opening portion 11d is provided at an upper side of the opening portion 11b for taking out the evaporator 5. The opening portion 11d is positioned approximately at the same height position as the heater core 6 in the air conditioning case 11, and the heater core can be taken out through the opening portion 11d. Because an air passage is formed within the air conditioning case 11 and air flows through the air passage, air is hardly leaked from the opening portion 11d. However, a cap which is detachable relative to the opening portion 11d can be formed.

The mode switching portion 7 is formed on a downstream air side of the heater core 6 at an upper side of the air conditioning case 11. The mode switching portion 7 selects an air-blowing direction toward the passenger compartment. At an upper side of the mode switching portion 7, there is formed a face air passage 7a communicating with a face air outlet through which air is blown toward the head portion of a passenger in the passenger compartment, and a defroster air passage 7b communicating with a defroster air outlet through which air is blown toward an inner surface of a front windshield. At a side portion of the mode switching portion 7, there is formed a foot air passage communicating with a foot air outlet through which air is blown toward the foot portion of the passenger in the passenger compartment. Further, a plurality of doors for switching the face air passage 7a, the defroster air passage 7b and the foot air passage, such as plate doors and rotary doors, are formed within the mode switching portion 7.

As shown in FIG. 1, the blower unit 4 and the air conditioning unit 8 are disposed to form a predetermined distance therebetween, and communicate with each other through the middle duct 9. That is, the blower case 10 and the air conditioning case 11 are disposed to have a space therebetween. The predetermined distance between the blower unit 4 and the air conditioning unit 8 has at least a length of the evaporator 5 in the left-right direction of the vehicle when the evaporator 5 is assembled in the air conditioning case 11. That is, the predetermined distance between the blower unit 4 and the air conditioning unit 8 has at least L×cos θ, in which L indicates a length of the evaporator in an up-down direction in FIG. 3 and θ indicates the inclination angle of the evaporator 5. Thus, the evaporator 5 can be detached from the air conditioning case 11 into the space having the predetermined distance.

The air conditioning unit 8 is disposed at a slight lower position relative to the blower unit 4. Therefore, condensed water generated on the evaporator 5 does not flow into the blower unit 4 through the middle duct 9.

Next, the middle duct 9 is described in detail. The middle duct 9 is made of resin, and has approximately the same length as the predetermined distance between the blower case 10 and the air conditioning case 11. The opening end portion 9a at a side of the blower case 10 has a shape corresponding to the side opening portion 10b of the blower case 10, and is air-tightly (hermetically) connected to the side opening portion of the blower case 10 through a packing by using the L-shape insertion.

Figure 4:
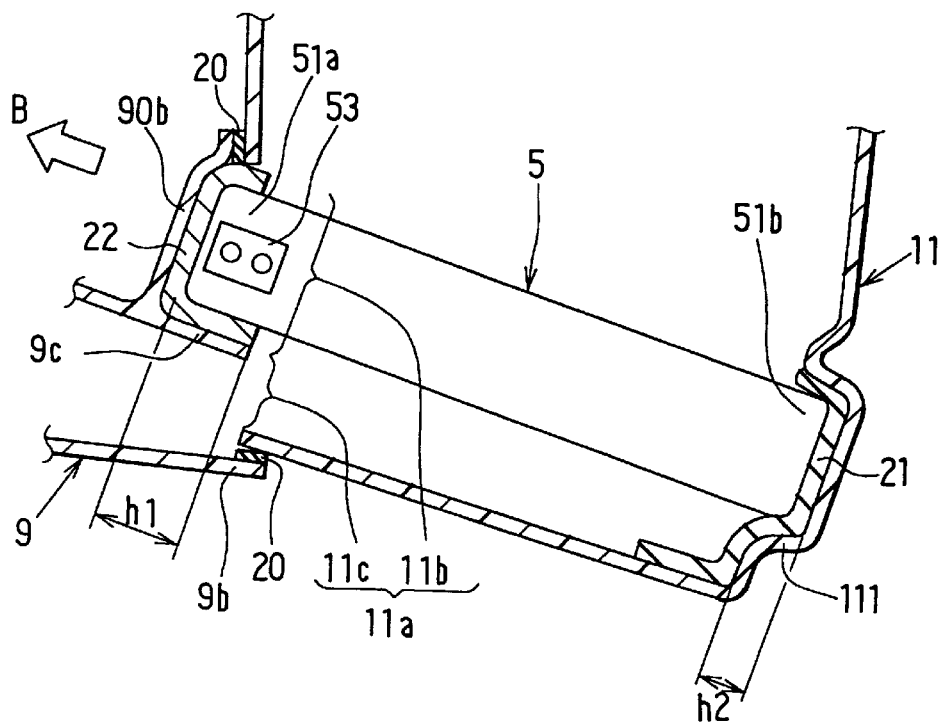
FIG. 4 is a schematic sectional view showing a connection state between a middle duct and an air conditioning case according to the embodiment.

FIG. 4 shows a connection state between the middle duct 9 and the opening portion 11a of the air conditioning case 11. An opening end portion 9b of the middle duct 9 has a shape corresponding to the shape of the opening portion 11a of the air conditioning case 11, and is air-tightly connected to the opening portion 11a of the air conditioning case 11 through a packing 20 by using a L-shape insertion.

In the embodiment, when the middle duct 9 is detachably connected to each of the blower case 10 and the air conditioning case 11, the middle duct 9 is inserted into each of the blower case 10 and the air conditioning case 11 by using L-shape insertion and is detachably connected to the blower case 10 and the air conditioning case 11 using fastening means such as a screw. Therefore, the middle duct 9 is detachable relative to the blower case 10 and the air conditioning case 11.

A lower side of the opening end portion 9b of the middle duct 9 is air-tightly connected to the ventilation opening portion 11c of the air conditioning case 11, so that an air passage through which air from the middle duct 9 is introduced into a lower side of the evaporator 5 is formed. On the other hand, a cover portion 90b for closing the opening portion 11b of the air conditioning case 11 is formed at an upper side of the opening end portion 9b of the middle duct 9.

A receiving portion 9c for supporting the evaporator 5 is formed on inner surface of the cover portion 90b to protrude from the inner surface of the cover portion 90 toward a side of the evaporator 5. In the embodiment, as shown in FIG. 4, the receiving portion 9c is positioned at a boundary between a lower portion of the opening end portion 9b of the middle duct 9 and the cover portion 90b. However, the receiving portion 9c may be formed at the other portion. On the other hand, a recess-shaped receiving portion 11 for supporting the evaporator 5 is formed on inner surface of the air conditioning case 11.

The tank portions 51a, 51b of the evaporator 5 is supported by the receiving portions 9c, 111 so that the evaporator 5 is fixed within the air conditioning case 11. A protrusion length h1 of the receiving portion 9c and a recess length h2 of the receiving portion 111 are respectively set to sufficiently support the evaporator 5. In the embodiment, the protrusion length h1 of the receiving portion 9 is 20 mm, and the recess length h2 of the receiving portion 111 is 10 mm, for example.

Figure 5:
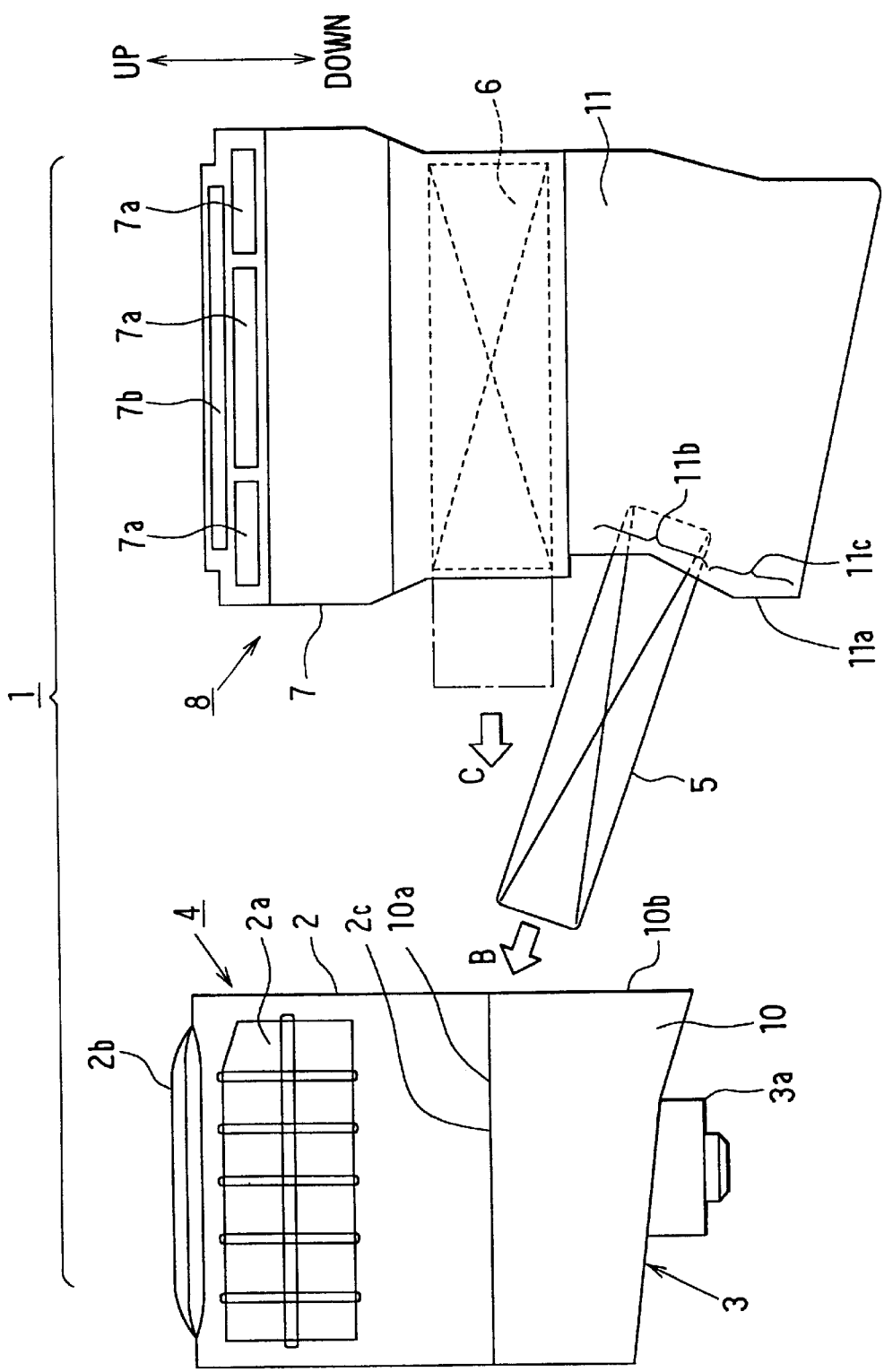
FIG. 5 is a diagrammatic view showing a detachment method of the evaporator from the air conditioning case.
Figure 6:
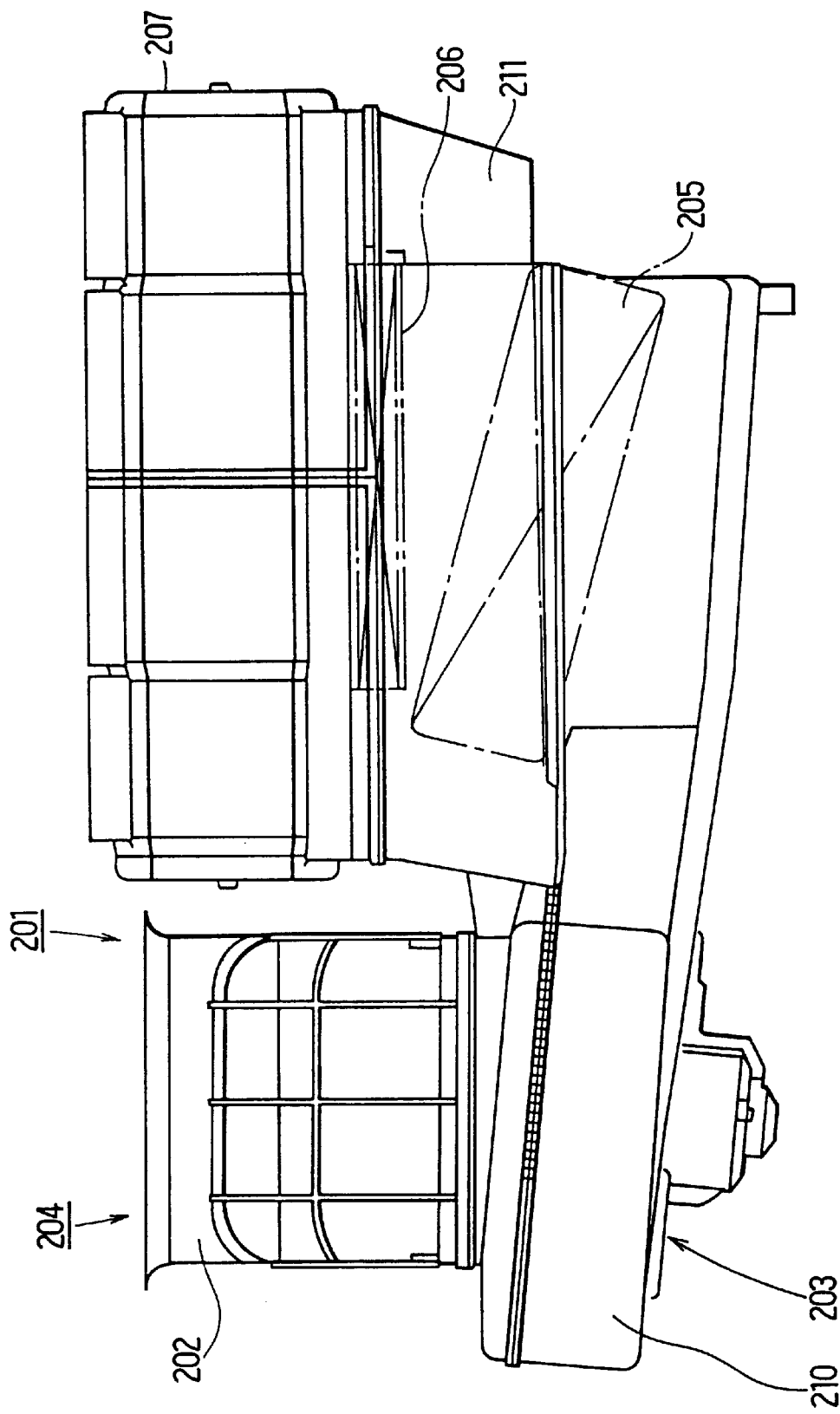
FIG. 6 is schematic view showing a conventional air conditioning apparatus.

As shown in FIG. 4, an insulator 21 having an elasticity and a heat-insulating performance adheres to the inner surface of the air conditioning case 11 to extent from the receiving portion 111 to a bottom surface of the air conditioning case 11. That is, the insulator 21 is disposed between the tank portion 51b of the evaporator 5 and the receiving portion 111 of the air conditioning case 11. By the insulator 21, heat transmission between the tank portion 51b of the evaporator 5 and the outside of the air conditioning case 11 can be interrupted, dimension error can be absorbed when the evaporator 5 is assembled in the air conditioning case 11, and an oscillation of the evaporator 5 can be prevented when the vehicle travels. Further, an insulator 22 adheres to the tank portion 51a, and has the same function as the insulator 21. Therefore, the bottom surface of the tank portion 51a is supported by the receiving portion 9c through the insulator 22, the upper surface of the tank portion 51a is supported by the upper side inner wall of the cover portion 90 and a circumference portion of the opening portion 11b through the insulator 22. Further, the upper and lower surfaces of the tank portion 51b are supported by the receiving portion 111d through the insulator 21. The up-down direction of the tank portions 51a, 51b in FIG. 4 corresponds to the up-down direction of the vehicle. In FIGS. 1, 5, the receiving portions 9c, 111 are not indicated.

Next, an operation of the air conditioning apparatus 1 according to the embodiment will be now described. When an operation switch of the air conditioning apparatus 1 is turned on, air introduced from the inside/outside air switching box 2 approximately horizontally flows from the blower case 10 toward the middle duct 9 by the blower 3. Air from the middle duct 9 flows into a lower space of the evaporator 5 in the air conditioning case 11, upwardly flows through the evaporator 5 from a lower surface to be cooled and dehumidified in the evaporator 5, and is introduced into the heater core 6 to be heated in the heater core 6.

Hot water flowing into the heater core 6 is adjusted by the hot-water control valve, so that the temperature of air blown toward the passenger compartment can be controlled. Air heated in the heater core 6 to have a predetermined temperature is blown toward the passenger compartment from a predetermined air outlet selected by the mode switching portion 7.

When the evaporator 5 is taken out from the air conditioning apparatus 1 for a maintenance of the evaporator 5, the middle duct 9 is firstly detached from the blower case 10 and the air conditioning case 11, while the blower case 10 and the air conditioning case 11 are installed in the vehicle. That is, after the fastening member of the middle duct 9 is removed, the middle duct is elastically deformed to be detached from the blower case 10 and the air conditioning case 11.

Next, the evaporator 5 is taken out from the opening portion 11b of the air conditioning case 11, while being slide between the blower case 10 and the air conditioning case 11 in a direction shown by B in FIGS. 4, 5. Therefore, in the embodiment, the evaporator 5 can be taken out from the air conditioning case 11 by only the detachment of the middle duct 9, while the blower case 10 and the air conditioning case 11 are mounted on the vehicle. That is, when the evaporator 5 is detached from the air conditioning unit 8, the blower case 10 and the air conditioning case 11 maintain the attachment state on the vehicle.

The evaporator 5 having taken out from the air conditioning case 11 is repaired and cleaned, and is accommodated again in the air conditioning case 11 from the opening portion 11b. Alternatively, a new evaporator is attached within the air conditioning case 11 from the opening portion 11b. Thereafter, the middle duct 9 is connected to both the blower case 10 and the air conditioning case 11, and the changing steps of the evaporator 5 are finished.

Further, as shown in FIG. 5, the heater core 6 can be taken out from the opening portion 11d of the air conditioning case 11, while being slide between the blower case 10 and the air conditioning case 11 in a direction shown by arrow C in FIG. 5.

As described above, in the air conditioning apparatus 1, because a space to which the evaporator 5 is taken out is provided between the blower case 10 and the air conditioning case 11, the evaporator 5 can be taken out from the air conditioning case 11 without a detachment of the air conditioning case 11 having the evaporator 5 from the vehicle. That is, in the embodiment of the present invention, when the evaporator 5 is detached from the air conditioning case 11, the air conditioning case 11 is not detached from the vehicle. Thus, the operation for changing or maintaining the evaporator 5 can be made simple, and change time or maintenance time of the evaporator 5 can be greatly reduced.

According to the embodiment of the present invention, because the evaporator 5 is fixed to the air conditioning case 11 by using the receiving portions 9c, 111, a fastening member for fastening the evaporator 5 is not necessary; and therefore, the air conditioning apparatus 1 has a simple structure and can be formed in low cost.

According to the embodiment of the present invention, the division portion between the middle duct 9 and the air conditioning case 11 is the opening portion 11a of the air conditioning case 11. Therefore, for example, it is compared with a case where the middle duct 9 extends until the bottom of the air conditioning case 11, the middle duct 9 has a simple structure and can be readily formed.

Further, according to the embodiment of the present invention, because the heater core 6 can be also taken out to the space between the blower case 10 and the air conditioning case 11, a change operation of the heater core 6 can be made simple, and a change time for changing the heater core 6 can be reduced.

Although the present invention has been fully described in connection with the preferred embodiment thereof with reference to the accompanying drawings, it is to be noted that various changes and modifications will become apparent to those skilled in the art.

For example, the blower unit 4 and the air conditioning unit 8 may be arranged to be opposite to the arrangement of the above-described embodiment in the left-right direction of the vehicle. In this case, the middle duct 9 is also arranged oppositely in the left-right direction of the vehicle in accordance with the arrangement state between the blower unit 4 and the air conditioning unit 8.

Further, the opening portion 11d for taking out the heater core 6 may be set at the other side wall surface except the side wall surface 110 of the air conditioning casing 11. Further, the opening portion 11d may be not provided. In this case, the mode switching portion 7 is formed detachably, so that the heater core 6 can be readily taken out from the air conditioning case 11.

In the above-described embodiment, the opening portion 11b and the ventilation opening portion 11c may be formed separately in the opening portion 11a. For example, a partition portion may be formed between the opening portion 11b and the ventilation opening portion 11c.

Such changes and modifications are to be understood as being within the scope of the present invention as defined by the appended claims.

What is claimed is:

1. An air conditioning apparatus for a vehicle having a passenger compartment, comprising:

a first case;

a blower, disposed in said first case, for blowing air toward the passenger compartment;

a second case for forming an air passage, said second case being disposed at a side of said first case to form a space having a predetermined distance therebetween;

a cooling heat exchanger for cooling air in said air passage, said cooling heat exchanger being disposed in said second case approximately horizontally at a side of said blower;

a heating heat exchanger for heating air from said cooling heat exchanger, said heating heat exchanger being disposed in said second case approximately horizontally at an upper side of said cooling heat exchanger;

a mode switching unit, disposed at a downstream air side of said heating heat exchanger, for switching a blowing-direction toward the passenger compartment of air which is heated in said heating heat exchanger to have a predetermined temperature; and a middle duct disposed between said first case and said second case to be detachably connected to said first case and said second case, in such a manner that air blown by said blower is introduced into said cooling heat exchanger through said middle duct, wherein second case has a first opening portion through which said cooling heat exchanger is detached from said second case to the space between said first case and said second case by a detachment of said middle duct from said first and second cases.

2. The air conditioning apparatus according to claim 1, further comprising a first receiving portion, formed on an inner surface of said middle duct, for supporting a bottom surface of said cooling heat exchanger.

3. The air conditioning apparatus according to claim 2, wherein said receiving portion is formed integrally with said middle duct to protrude from the inner surface of said middle duct.

4. The air conditioning apparatus according to claim 1, wherein said cooling heat exchanger is disposed in said second case to be slightly inclined relative to a horizontal direction in such a manner that air blown from said blower is introduced into said cooling heat exchanger from below through said middle duct.

5. The air conditioning apparatus according to claim 4, further comprising a first receiving portion, formed on an inner surface of said middle duct, for supporting a bottom surface of said cooling heat exchanger.

6. The air conditioning apparatus according to claim 5, wherein:

said second case has a side wall surface opposite to said first case;

said first opening portion is formed in said side wall surface at a lower side thereof;

said middle duct has a cover portion which is connected to said second case to close said first opening portion when said cooling heat exchanger is installed in said second case; and said first receiving portion is formed in said cover portion.

7. The air conditioning apparatus according to claim 5, further comprising a second receiving portion, formed on an inner surface of said second case, for supporting said cooling heat exchanger.

8. The air conditioning apparatus according to claim 7, wherein:

said cooling heat exchanger includes a plurality of flat tubes through which refrigerant flows, and first and second tanks for distributing refrigerant to said flat tubes and for rejoining refrigerant from said flat tubes; and said first tank is held in said first receiving portion and said second tank is held in said second receiving portion.

9. The air conditioning apparatus according to claim 1, wherein only said middle duct is detached from said first and second cases while said first case and second case are maintained at an attachment state in the vehicle, when said cooling heat exchanger is detached from said second case into the space between said first case and said second case.

10. The air conditioning apparatus according to claim 1, wherein said mode switching unit is disposed at an upper side of said heating heat exchanger.

11. The air conditioning apparatus according to claim 1, wherein the second case has a second opening portion for detaching said heating heat exchanger from said second case to said space between said first case and said second case.

12. An air conditioning apparatus for a vehicle having a passenger compartment, said air conditioning apparatus comprising:

a first case being attached to the vehicle;

a blower, disposed in said first case, for blowing air toward the passenger compartment;

a second case for forming an air passage, said second case being attached to the vehicle at a side of said first case to form a space having a predetermined distance therebetween;

a cooling heat exchanger for cooling air in said air passage, said cooling heat exchanger being disposed in said second case approximately horizontally;

a heating heat exchanger for heating air from said cooling heat exchanger, said heating heat exchanger being disposed in said second case approximately horizontally at an upper side of said cooling heat exchanger; and a middle duct disposed between said first case and said second case to be detachably connected to said first case and said second case, in such a manner that air blown by said blower is introduced into said cooling heat exchanger through said middle duct, wherein said cooling heat exchanger is detachable from said second case to the space between said first case and said second case while said first case and said second case are attached to the vehicle, after only said middle duct is detached from said first and second cases.

13. The air conditioning apparatus according to claim 12, further comprising:

a first receiving portion, formed on an inner surface of said middle case, for supporting a bottom surface of said cooling heat exchanger; and a second receiving portion, formed on an inner surface of said second case, for supporting said cooling heat exchanger.

* * * * *